US008799324B2

(12) United States Patent
Ngo et al.

(10) Patent No.: US 8,799,324 B2
(45) Date of Patent: Aug. 5, 2014

(54) METHOD AND SYSTEM FOR MOBILE TELEMETRY DEVICE PRIORITIZED MESSAGING

(75) Inventors: Huey-Jiun Ngo, Flowood, MS (US); Robert Lee, Terry, MS (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1996 days.

(21) Appl. No.: 10/758,768

(22) Filed: Jan. 16, 2004

(65) Prior Publication Data

US 2005/0251579 A1 Nov. 10, 2005

(51) Int. Cl.
*G06F 17/30* (2006.01)

(52) U.S. Cl.
USPC .......................................................... 707/799

(58) Field of Classification Search
USPC .................................. 707/100, 799; 709/207
See application file for complete search history.

(56) References Cited

U.S. PATENT DOCUMENTS

| | | | | |
|---|---|---|---|---|
| 6,055,564 | A * | 4/2000 | Phaal | 709/207 |
| 6,178,523 | B1 * | 1/2001 | Klein | 714/24 |
| 6,295,492 | B1 | 9/2001 | Lang et al. | |
| 6,421,725 | B1 * | 7/2002 | Vermilyea et al. | 709/224 |
| 6,597,892 | B1 * | 7/2003 | Caldwell et al. | 455/12.1 |
| 6,611,740 | B2 | 8/2003 | Lowrey et al. | |
| 6,636,790 | B1 | 10/2003 | Lightner et al. | |
| 6,692,991 | B2 * | 2/2004 | Minamio et al. | 438/123 |
| 6,732,031 | B1 | 5/2004 | Lightner et al. | |
| 6,740,075 | B2 * | 5/2004 | Lebel et al. | 604/891.1 |
| 6,754,583 | B2 | 6/2004 | Verbil | |
| 6,847,892 | B2 * | 1/2005 | Zhou et al. | 701/408 |
| 6,992,991 | B2 * | 1/2006 | Duske et al. | 370/316 |
| 7,032,101 | B2 * | 4/2006 | Gschwind et al. | 712/214 |
| 7,194,395 | B2 * | 3/2007 | Genovese | 703/6 |
| 2002/0087723 | A1 * | 7/2002 | Williams et al. | 709/240 |
| 2002/0173885 | A1 | 11/2002 | Lowrey et al. | |
| 2002/0178275 | A1 * | 11/2002 | Hein et al. | 709/231 |
| 2003/0014603 | A1 * | 1/2003 | Sasaki et al. | 711/158 |
| 2003/0053469 | A1 * | 3/2003 | Wentink | 370/412 |
| 2003/0093167 | A1 * | 5/2003 | Sim | 700/90 |
| 2003/0120811 | A1 * | 6/2003 | Hanson et al. | 709/245 |
| 2003/0197679 | A1 * | 10/2003 | Ali et al. | 345/158 |
| 2004/0125800 | A1 * | 7/2004 | Zellner | 370/389 |
| 2004/0151114 | A1 * | 8/2004 | Ruutu | 370/230 |
| 2004/0249826 | A1 * | 12/2004 | Bodin et al. | 707/707 |
| 2005/0047425 | A1 * | 3/2005 | Liu et al. | 370/411 |
| 2008/0109509 | A1 * | 5/2008 | Dickerson et al. | 709/201 |
| 2008/0212541 | A1 * | 9/2008 | Vayanos et al. | 370/335 |

* cited by examiner

*Primary Examiner* — Robert Beausoliel, Jr.
*Assistant Examiner* — Alexandria Bromell

(57) ABSTRACT

An approach is provided for prioritizing transmission of messages from a telemetry device. A first information element is stored in a device log. A determination is made whether the first information element includes a first priority level indication, and the first information element is stored in a first data structure when it is determined that the first information element includes the first priority level indication. A second information element is stored in the device log. A determination is made whether the second information element includes a second priority level indication, and the second information element is stored in a second data structure when it is determined that the second information element includes the second priority level indication. A first message is transmitted based on the first information element, and after the first message is transmitted, a second message is transmitted based on the second information element, wherein an ordering of transmission is based on the first and second level priority indications.

25 Claims, 12 Drawing Sheets

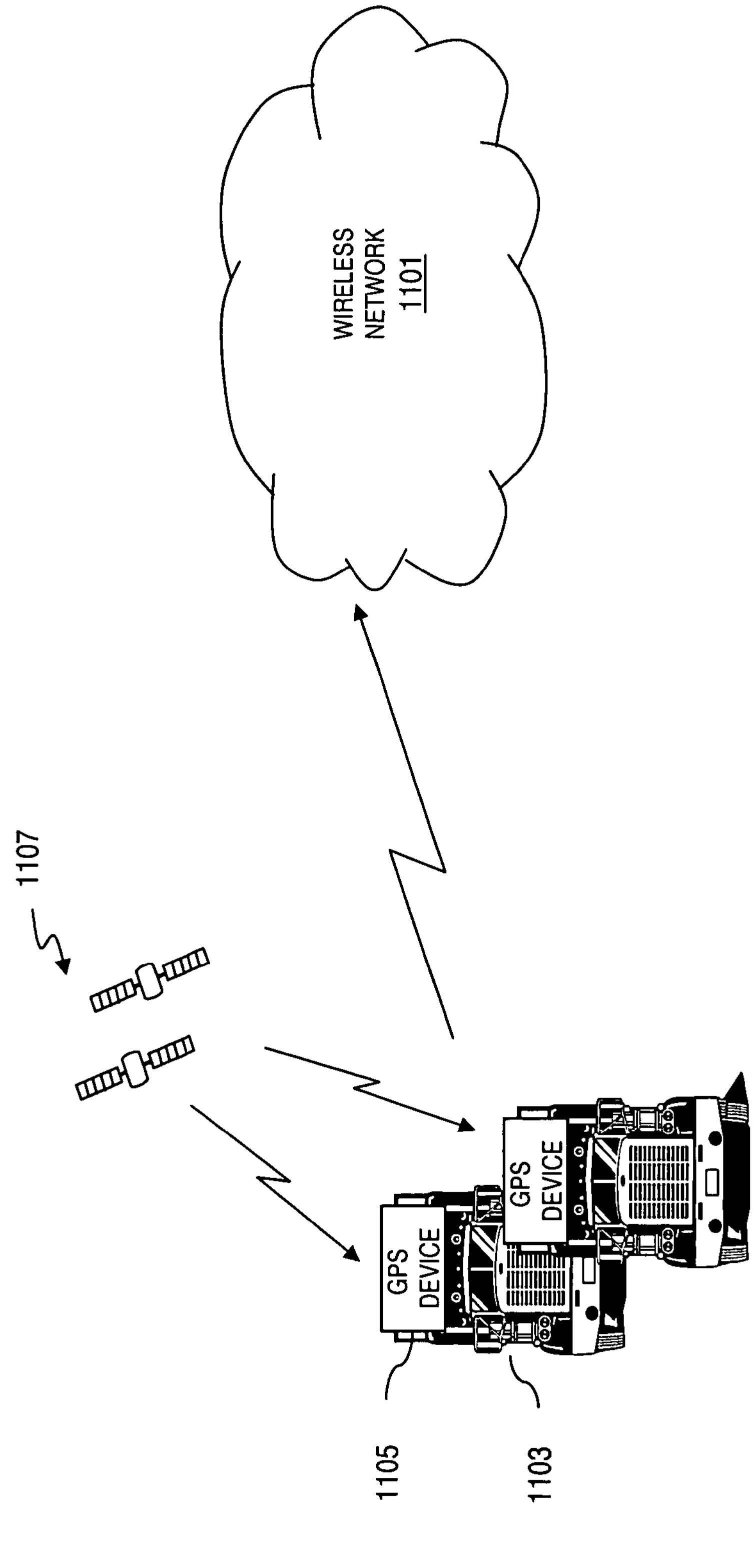
FIG. 11 *BACKGROUND ART*

METHOD AND SYSTEM FOR MOBILE TELEMETRY DEVICE PRIORITIZED MESSAGING

FIELD OF THE INVENTION

The present invention relates to data communications, and more particularly, to prioritizing messages for tracking mobile telemetry devices for fleet and asset management.

BACKGROUND OF THE INVENTION

Modern wireless networks, such as paging systems, can readily be configured to offer a variety of telemetry services, notably fleet and asset management. The management of vehicles within a fleet as well as assets involves obtaining information, generally in real-time, about the location and movement of these objects. The fleet manager utilizes this information to maximize use of fleet resources. With the advent of the Global Positioning System (GPS) supported by a constellation of satellites, a vehicle may determine its location with great accuracy and convenience if no obstruction exists between the GPS receiver within the vehicle and the satellites. Additionally, in recognition of the utility of real-time location of vehicles, governmental bodies have begun to impose strict requirements for determining position information of emergency 911 callers. Therefore, with the impetus stemming from competitive and regulatory forces, service providers seek to offer an efficient, cost-effective fleet and asset management service with robust capability by effectively integrating GPS technology with wireless networks so as to minimize bandwidth in the exchange of telemetry data.

FIG. 11 shows a diagram of a conventional wireless network in an autonomous GPS environment. As shown, a wireless network 1101 communicates with vehicles 1103 to track the location of these vehicles 1103 within the coverage area of the wireless network 1101. Each of the vehicles 1103 employ a GPS device 1105 that communicate with a constellation of satellites 1107. These satellites 1107 transmit very low power interference and jamming resistant signals received by the GPS receivers 1105. At any point on Earth, a GPS device 1105 is able to receive signals from multiple satellites (e.g., 6 to 11).

A GPS device 1105 may determine three-dimensional geolocation from signals obtained from at least four satellites. Measurements from satellite tracking and monitoring stations located around the world are incorporated into orbital models for each satellite to compute precise orbital or clock data. GPS signals are transmitted over two spread spectrum microwave carrier signals that are shared by all of the GPS satellites 1107. The device 1105 must be able to identify the signals from at least four satellites 1107, decode the ephemeris and clock data, determine the pseudo range for each satellite 1107, and compute the position of the receiving antenna. The time required to acquire a position depends on several factors including the number of receiving channels, processing power of the receiving device, and strength of the satellite signals.

The above arrangement, as an autonomous GPS environment, has a number of drawbacks that can hinder its effectiveness as a fleet management system. Because the GPS device 1105 must obtain all of the ephemeris data from the satellite signals, weak signals can be problematic. A building location or a location in any area that does not have clear view of the satellite constellation 1107 can prevent the GPS device 1105 from determining its geolocation. Also, cold start acquisition may consume a few seconds to as much as a few minutes, which is a significant delay for the device's ability to log positional information and evaluate its position against pre-configured alert conditions.

The vehicles 1103 then need to transmit the location information to the wireless network 1101. These transmissions can consume large amounts of bandwidth of the wireless network 1101 if the location information is continually transmitted without attention to the polling scheme and the underlying transmission protocol used to transport such data. Additionally, conventional limitations on the amount of storage available on devices configured for tracking of vehicles 1103 constrain the amount of information that may be retained for communication with the wireless network 1101.

If one of the vehicles 1103 is in imminent danger, e.g., of losing its ability to communicate with the wireless network 1101 for some reason, it may not be able to transmit to the wireless network 1101 information needed for the wireless network 1101 to be able to respond to needs of the vehicle 1101 in a timely manner. This may be especially critical, e.g., if the vehicle 1103 is progressing into a state which may pose an imminent danger to occupants of the vehicle. Additionally, if the vehicle 1103 loses its ability to communicate with the wireless network 1101 for an extended period of time, it may be difficult to determine critical information which was available at the vehicle 1103, but had not been communicated, just prior to the loss of communication with the wireless network 1101.

Therefore, there is a need for a fleet and asset management system that prioritizes information to be sent from the vehicles 1103 to ensure timely acquisition of location information, while ensuring that urgent information is communicated from the vehicle prioritized over other information that is less urgent. There is also a need to maintain certain information that may be available to the vehicle 1103, but that has not been sent from the vehicle 1103 prior to a loss of ability to communicate with the wireless network 1101. There is also a need to efficiently utilize precious resources of the wireless network in support of fleet and asset management services.

SUMMARY OF THE INVENTION

These and other needs are addressed by the present invention, in which an approach for tracking mobile telemetry devices over a two-way wireless network in support of fleet and asset management is provided. Each of the telemetry devices can operate in multiple Global Positioning System (GPS) modes: autonomous GPS mode, and mobile-based assisted-GPS (A-GPS) mode. In autonomous mode, GPS data may be acquired with no assistance data provided by the wireless network. When a telemetry device is within the network coverage area of the wireless network, the telemetry device operates in the A-GPS mode, in which assistance data is supplied by an A-GPS server resident within a Network Operations Center (NOC). The assistance data can include ephemeris data, approximate location, time, and other GPS aiding data needed to obtain location quickly or in obstructed view locations (in building, wooded areas, etc.). The NOC also includes a presentation server that executes a number of applications in support of fleet and asset management: a database application for maintaining configuration information of the telemetry devices and the user account information; and a web-based application for serving maps, presenting user interfaces to manage and control user administration, and the device configuration.

Each of the telemetry devices accumulates information for transmission to the provider and stores the information for messages to be transmitted (e.g., messages associated with responses made to a request made to the device, messages that are generated when a status of the device changes, messages generated when alert criteria are met, messages generated when a schedule indicates that data should be transmitted) in multiple prioritized queues to ensure, e.g., that more urgent messages are sent before less urgent messages. Additionally, device data (e.g., GPS information, Input/Output (I/O) data, sample times) is stored in a log and may be transmitted if needed. When the prioritized queues are full, no more information is stored in the queues until messages are transmitted from the queues to allow space for more information. The log is configured to delete older data as space become full, so that only newer data is kept in the log. Some of the message information may be derived from data in the data log. The above arrangement advantageously provides timely and prioritized communication of information from the telemetry device, while effectively utilizing limited storage available on the device, and minimizing use of network resources.

According to one aspect of the present invention, a method for prioritizing transmission of messages from a telemetry device is disclosed. The method includes storing a first information element in a device log. The method also includes determining whether the first information element includes a first priority level indication, and storing the first information element in a first data structure when it is determined that the first information element includes the first priority level indication. The method includes storing a second information element in the device log. The method also includes determining whether the second information element includes a second priority level indication and storing the second information element in a second data structure when it is determined that the second information element includes the second priority level indication. The method additionally includes transmitting a first message based on the first information element, and after transmitting the first message, transmitting a second message based on the second information element. An ordering of transmission is based on the first and second level priority indications.

According to another aspect of the present invention, a telemetry device for prioritizing transmission of messages from the telemetry device is disclosed. The telemetry device includes a device log including a first information element and a second information element. The device also includes a first data structure, other than the device log, including the first information element which includes a first priority level indication, and a second data structure, other than the device log, including the second information element which includes a second priority level indication. The device also includes a processor configured to determine whether the first information element includes a first priority level indication, to determine whether the second information element includes a second priority level indication, to transmit a first message based on the first information element, and after transmitting the first message, to transmit a second message based on the second information element. An ordering of transmission is based on the first and second level priority indications.

According to another aspect of the present invention, a computer-readable medium carrying one or more sequences of one or more instructions for prioritizing transmission of messages to be transmitted from a telemetry device is disclosed. The one or more sequences of one or more instructions include instructions which, when executed by one or more processors, cause the one or more processors to perform the steps of storing a first information element in a device log; determining whether the first information element includes a first priority level indication; storing the first information element in a first data structure when it is determined that the first information element includes the first priority level indication; storing a second information element in the device log; determining whether the second information element includes a second priority level indication; storing the second information element in a second data structure when it is determined that the second information element includes the second priority level indication; transmitting a first message based on the first information element; and after transmitting the first message, transmitting a second message based on the second information element, wherein an ordering of transmission is based on the first and second level priority indications.

According to another aspect of the present invention, a method for prioritizing transmission of messages from a telemetry device is disclosed. The method includes storing a plurality of information elements in a device log. The method also includes selectively storing each of a group of the plurality of information elements in one of a plurality of data structures based on a priority indicator associated with each one of the information elements of the group. The method additionally includes selecting one of the plurality of data structures based on one of the priority indicators, and transmitting a message including one of the information elements of the selected one of the data structures.

According to yet another aspect of the present invention, an apparatus for prioritizing transmission of messages from a telemetry device is disclosed. The apparatus includes means for storing a plurality of information elements in a device log. The apparatus also includes means for selectively storing each of the plurality of information elements in one of a plurality of data structures based on a priority indicator associated with each one of the information elements. The apparatus also includes means for selecting one of the plurality of data structures based on one of the priority indicators, and means for transmitting a message including one of the information elements of the selected one of the data structures.

Still other aspects, features, and advantages consistent with the present invention are readily apparent from the following detailed description, simply by illustrating a number of particular embodiments and implementations, including the best mode contemplated for carrying out the present invention. Methods, systems, and articles of manufacture consistent with the present invention are also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 11 is a diagram of a conventional wireless network in an autonomous GPS environment.

DESCRIPTION OF THE PREFERRED EMBODIMENT

A system, method, and software for timely and prioritized communication of information from a mobile telemetry device are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
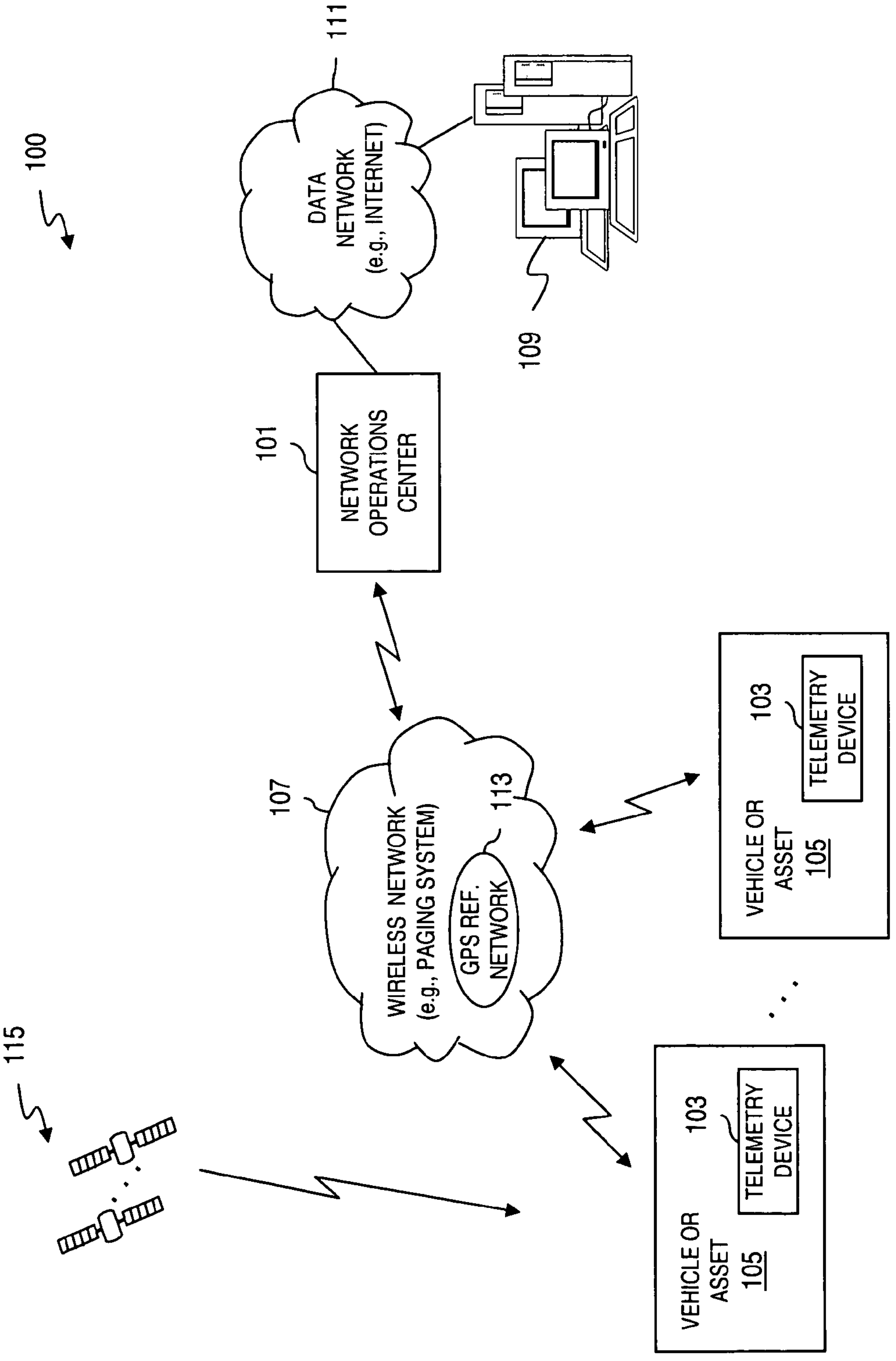
FIG. 1 is a diagram of a fleet and asset tracking system, according to an embodiment of the present invention.

FIG. 1 shows a diagram of a fleet and asset tracking system, according to an embodiment of the present invention. The system 100, in contrast to the system of FIG. 11, utilizes a combination of autonomous GPS and Assisted GPS (A-GPS); in particular, mobile-centric A-GPS. The system 100 includes a Network Operation Center (NOC) 101 for tracking telemetry devices 103, which, under this scenario, are resident within vehicles 105. It is contemplated that the telemetry device 103 can be affixed to an asset (or any other object). A wireless network 107 supports two-way communication among the telemetry devices 103 and the NOC 101; the wireless network 107, in an exemplary embodiment, is a two-way paging system employing the ReFLEX™ protocol by Motorola for two-way advanced messaging. The telemetry devices 103 have two modes of operation: autonomous GPS mode, and A-GPS mode. When operating in A-GPS mode, the system 100 can provide for better in building or obstructed view geolocation with in a paging system zone. When out of network coverage, the autonomous GPS may be used to obtain geolocation data that may be stored on the device for later transmission.

The NOC 101 provides the necessary fleet and asset management functions, such as user account creation and management, access control, and deployment of business rules; these functions are more fully described below with respect to FIG. 3. The NOC 101 also supports remote management capabilities by hosts 109 over a data network 111, such as the global Internet.

To better understand the hybrid A-GPS environment of the system 100, it is instructive to describe the operation of the general operation of a mobile-centric A-GPS system. The telemetry device 103 has GPS hardware and intelligence, whereby the network 107 in conjunction with the NOC 101 employs mechanisms for providing GPS data (or assistance data). The network 107 includes base transmitters and some base receivers containing GPS hardware from which the ephemeris and approximate location can be obtained, constituting a GPS reference network 113.

The assistance data that is transmitted to the devices 103, in an exemplary embodiment, can include ephemeris data differential GPS correct data, timing data and/or other aiding data. Using the aiding (or assistance) data, the telemetry devices 103 performs geolocation calculations, yielding a number of advantages. For example, the telemetry devices 103 can generate real-time speed and route adherence alerts. Additionally, transmission of geolocation data need not be frequent. Transmission of geolocation data is more compact because it is true location rather than pseudo range data. Also, the telemetry devices 103 can more intelligently request assistance data because the devices 103 themselves can determine when the ephemeris data is no longer valid.

The hybrid A-GPS system 100 thus permits fast and precise geolocation when in network coverage of the network 101, while providing immunity from obstructed view of the sky. Also, the switch to autonomous GPS mode when outside of the coverage area of the network 101, the devices 103 can still obtain geolocation data. This data can be stored within the device 103 and transmitted to the NOC 101 when the associated vehicle 105 returns to the network coverage area.

As noted earlier, the telemetry devices 103 may be attached to a host entity such as a vehicle or other valuable asset. The device may be used to track, monitor, and control aspects of the host entity. These devices 103 are configurable with respect to the existence and number of digital inputs/outputs (I/O), analog inputs/outputs (I/O), and device port interfaces for connection with peripheral devices. By way of examples, the digital inputs can be used to monitor various components of the vehicles 105: ignition status, door lock status, generic switch status, headlight status, and seat occupancy status. The digital outputs can be used to control, for example, the starter, and door locks, and to monitor such parameters as engine temperature, cargo temperature, oil pressure, fuel level, ambient temperature, and battery voltage. The exact configuration of the telemetry devices 103 can be based on cost consideration and/or applications.

The telemetry devices 103, in an exemplary embodiment, employ a wireless protocol to receive commands and transmit data and alerts (e.g., high speed alert) over the radio network 107. Additionally, the telemetry devices 103 can queue alerts, message responses, and scheduled data, whereby if the devices 103 are unable to send the messages, the messages are queued and sent when the device 103 returns to wireless network coverage. Prioritized queues are used and include, for example, queues for high, normal, and low priority messages. In the exemplary implementation, critical device status changes are given highest priority, while other alerts and responses are given normal priority. Scheduled data messages are given the lowest priority. The queues are configured, as first in yields first out, wherein new messages are dropped when its corresponding queue is full. This arrangement advantageously allows for the status of the device 103 at the time of transmission failure to be known even when the data stored in the data log at time of the transmission has been overwritten.

The telemetry devices 103 can also respond to status (e.g., of position, speed, digital I/O port status, analog input channel status, peripheral status or other device status) queries transmitted by the NOC 101. The status query may request either current status or status within a time and date range. The device 103 responds to the query with either the current status or all status within the date range that is currently stored in the device's data log.

As regards data logging, the devices 103 support use of one or more schedules for the data acquisition. The data logging involves storing of the data locally on the device 103. This data, which can include position, speed, digital I/O port status, analog input channel status, peripheral status or other device status, is not automatically transmitted over the air. Instead, the data is stored for a finite period of time and made available for use by scheduled data acquisitions, data acquisitions on demand, and data acquisitions with alerts. The data log is circular in that when the last available memory for the data logger has been written, the data logger begins recording new data at the first location of memory available for the data logger.

With scheduled acquisitions of the data collected by the data logger, the data within the data log is transmitted by the device 103 according to a configurable schedule at the configured transmission rate. Multiple schedules may be configured on the device 103. Schedules are configured to obtain data at a regular interval based upon calendar time and date. Schedules may be configured such that they are enabled and disabled based upon status of a digital input. For example, an ignition status input may be used to turn a schedule on when the engine is on and turn the schedule off when the engine is off. A Response (or Data) Message Window value can be configured on the device 103, such that the device 103 delays sending scheduled data using an Offset within the Data Message Window (shown in FIG. 5). That is, the scheduled transmit time is adjusted by the Offset, the device 103 delays queuing the scheduled data until the time is equal to the transmit time plus the Offset. Use of the Data Message Window helps prevent overwhelming the wireless network when many devices are scheduled to transmit data at the same time. For example, it is likely that many schedules will be based upon transmitting on the hour, half past the hour, or at fifteen minute intervals. Using the Offset ensures that the scheduled data transmissions from all of the devices with similar schedules are not sent at precisely the same time. Given the precision of the telemetry device's clock (as it is based upon GPS time), this randomization of regularly scheduled device transmissions is particularly useful.

As mentioned previously, the telemetry devices 103 can be configured to monitor a variety of information relating to the vehicle or asset through the digital I/O and analog I/O. For instance, alerts can be used to indicate status change of the digital inputs. Each Digital Input Status Change Alert can be enabled and disabled through configuration. The alert may be configured to transmit other device status recorded at the time of the alert such as position, speed, status of other digital I/O ports, analog input status, peripheral status, or other device status. As regards the digital output, the status of each available digital output can be changed or read.

Similarly, the statuses of analog inputs of the devices 103 are monitored for change. In an exemplary embodiment, multiple threshold levels (e.g., high and low) can be set, whereby alerts are generated (e.g., Low Range Entry alert, Low Range Exit, High Range Entry, and High Range Exit). That is, if the value of the Analog Input falls below the Low Threshold, a Low Range Entry Alert is generated. If the value of the Analog Input rises above the Low Threshold plus a Hysteresis value, a Low Range Exit Alert is generated. In similar fashion, if the value of the Analog Input rises above the High Threshold minus a Hysteresis value, a High Range Entry Alert is output from the device 103. Also, if the value of the Analog Input falls below the High Threshold, a High Range Exit Alert is generated. The alert may be configured to transmit other device status recorded at the time of the alert such as position, speed, status of other digital I/O ports, analog input status, peripheral status, or other device status.

By way of example, the devices 103 can be used to monitor excessive speed via a High Speed Alert Control, whereby a High Speed Threshold can be set by a fleet manager. In addition, a duration parameter (i.e., High Speed Duration) can be utilized to specify the time at which the High Speed Threshold must be exceeded before an alert is generated. Further, a configurable High Speed Hysteresis parameter is set as the delta change below the High Speed Threshold used to determine when the High Speed Threshold has no longer been exceeded. The alert may be configured to transmit other device status recorded at the time of the alert such as position, speed, status of other digital I/O ports, analog input status, peripheral status, or other device status.

The system 100 also permits users via the hosts 109 to specify and configure areas of interest within the coverage area of the network 101 such that alerts can be generated when a device 103 enters or exits the configured areas. The alert may be configured to transmit other device status recorded at the time of the alert such as position, speed, status of other digital I/O ports, analog input status, peripheral status, or other device status.

Figure 3:
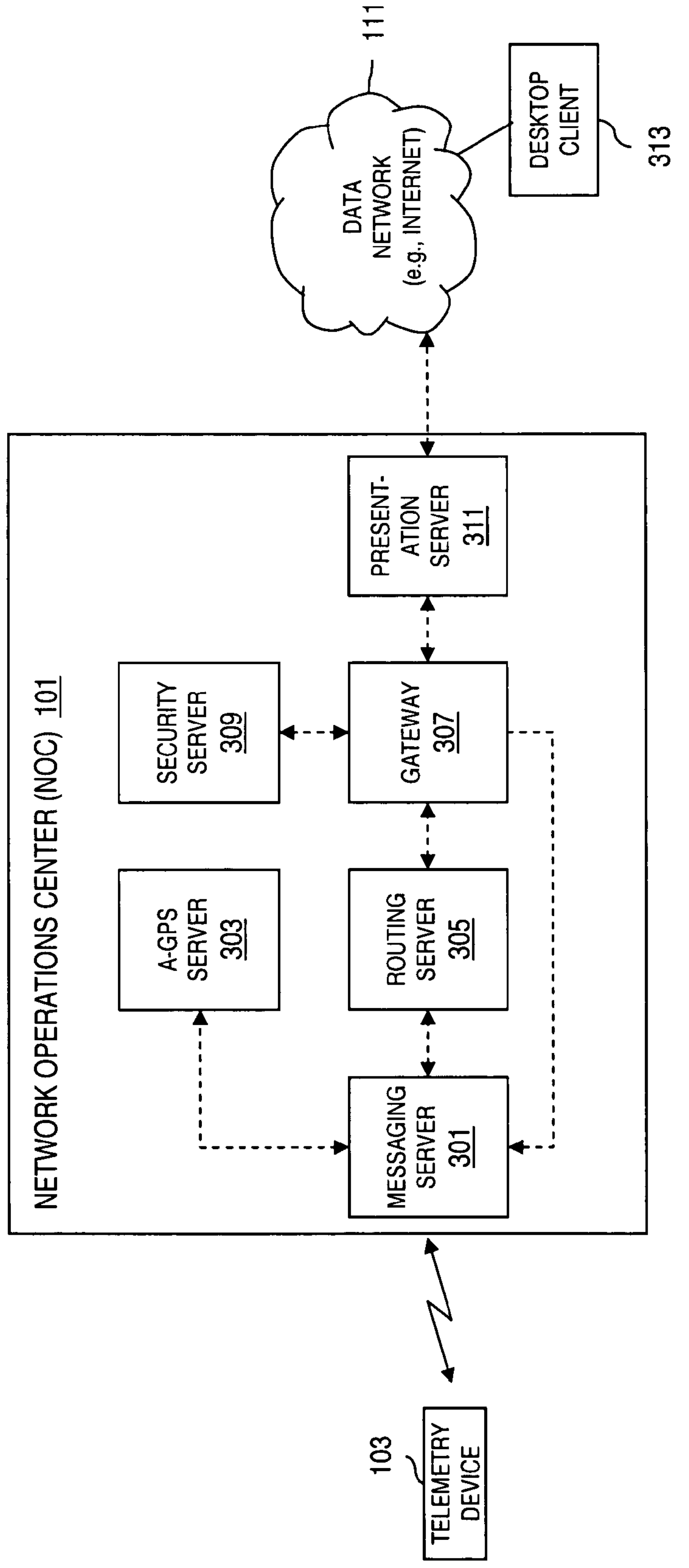
FIG. 3 is a diagram of a Network Operations Center (NOC) in the system of FIG. 1, according to an embodiment of the present invention.

The data collected and transmitted by the telemetry devices 103 are processed by the NOC 101, the components of which are described in FIG. 3.

Figure 2A:
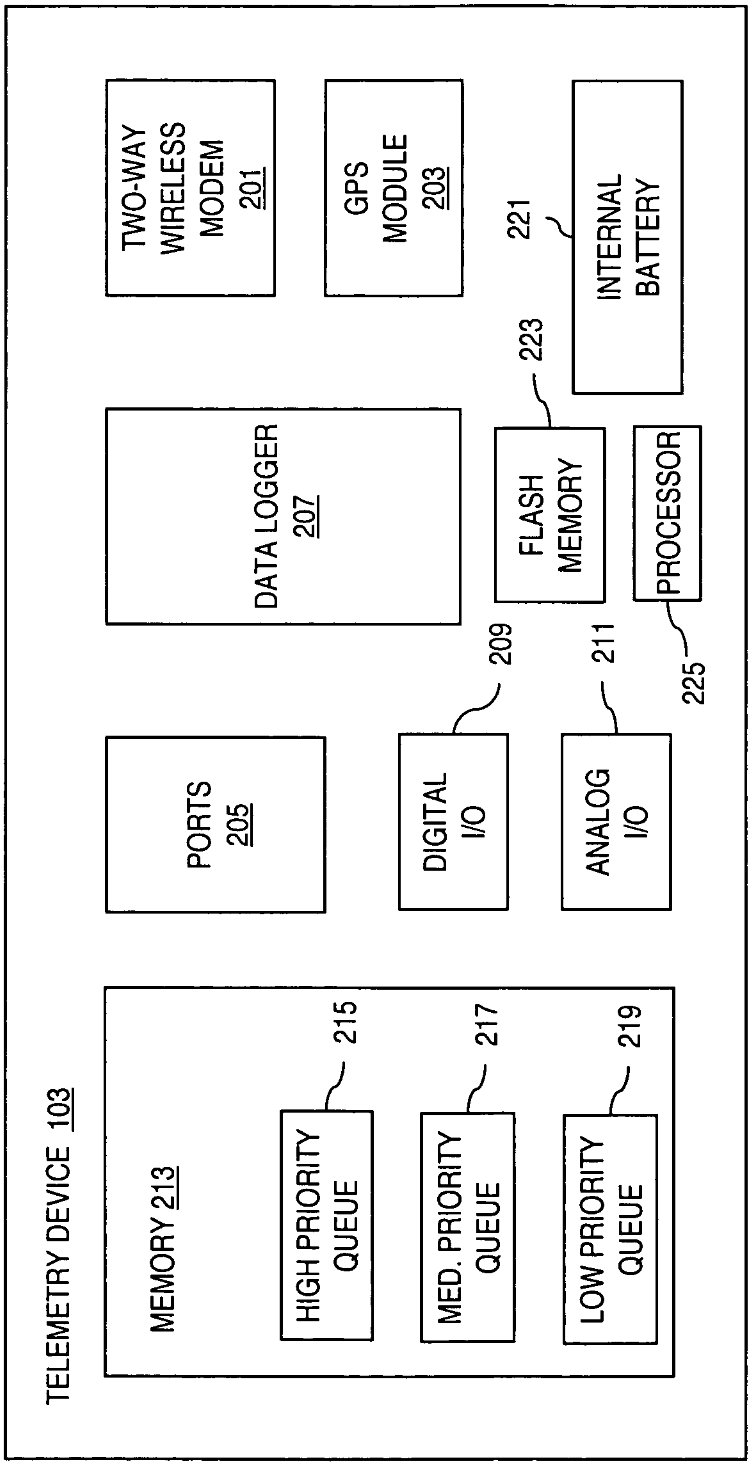
FIG. 2*a* is a diagram of a telemetry device used in the system of FIG. 1, according to an embodiment of the present invention.

FIG. 2*a* shows a diagram of a telemetry device used in the system of FIG. 1, according to an embodiment of the present invention. The telemetry device 103, which can be deployed within a vehicle (as shown in FIG. 1 or coupled to any asset), operates within the wireless network 107. By way of example, the components of the telemetry device 103 are described in the context of a narrowband network, such as a paging system; however, it is contemplated that the components for communications can be tailored to the specific wireless network.

In this exemplary embodiment, the telemetry device 103 includes a two-way wireless modem 201 for receiving and transmitting signals over the wireless network 107 according to the communication protocols supported by the wireless network 107, such as the Motorola ReFLEX™ protocol for two-way paging. By way of example, a Karli ReFLEX™ module by Advantra International can be used for the modem 201. The two-way wireless modem 201 couples to a two-way wireless antenna (not shown) that can be placed local to the device 103 or remote from the device 103 (e.g., 12 or more feet) to enhance flexibility in installation.

The telemetry device 103 also contains a GPS module 203 that is capable of operating in the multiple GPS modes: autonomous GPS mode, and mobile-based A-GPS mode. The GPS module 203 can employ, for example, a GPS receiver manufactured by FastraX—iTrax02/4. In autonomous mode, GPS data may be acquired with no assistance data provided by the wireless network 107. The GPS module 203 operates in the A-GPS mode when the device 103 is in wireless network coverage, in which assistance data is supplied and can include ephemeris data and data to obtain location in obstructed view locations (in building, wooded areas, etc.). Further, the assistance can include differential GPS (DGPS) to enhance location accuracy under some conditions. The GPS module 203 couples to a GPS antenna (not shown) that can be placed local to the device 103 or remote from the device 103 (e.g., 12 or more feet) to enhance flexibility in installation.

Attachment of peripheral modules to the telemetry device 103 is supported by one or more peripheral ports 205. The ports 205, for example, can be used to connect to intelligent peripherals that operate according to business rules and logic. These business rules and logic can be housed in a vehicle harness (not shown), which include an On-Board Diagnostic (OBDII) interface and intelligence. Under this arrangement, a user (e.g., fleet manager) can query any parameter available through the OBDII interface. For example, data obtained for each tracking record can include any combination of the following items: RPM (Revolutions Per Minute), oil pressure, coolant temperature, etc. Such data recorded by the telemetry device 103 is stored in memory 213. The acquisition period for the data is configurable, as well as the transmission interval to the NOC 101. Furthermore, the monitoring and subsequent data exchange can be governed by a configurable schedule, which can specify such parameters as start date, start time, end time, recurrence (e.g., daily, weekly, monthly, etc.), and duration.

Data is logged by a data logger 207, made available for use by scheduled data acquisitions, data acquisitions on demand, and data acquisitions associated with alerts. As mentioned, the telemetry device 103 also can be configured to include digital I/O 209 and analog I/O 211 for monitoring and control of the vehicle or asset. The data logger 207 also collects data associated with these I/O ports 209, 211.

The telemetry device 103 also includes a processor 225 that may handle arithmetic computations, and may support operating system and application processing. The processor 225, while shown as a single block, may be configured as multiple processors, any of which may support multipurpose processing, or which may support a single function.

The memory 213 of the telemetry device 103 can be organized to include multiple queues for prioritizing the messages to be processed by the device 103. In an exemplary embodiment, the memory 213 includes a High Priority queue 215, a Medium Priority queue 217, and Low Priority queue 219. The memory 213, while shown as a single block, may be configured as multiple memory devices, any of which may support static or dynamic storage, and may include code for operating system functionality, microcode, or application code.

Data recorded by the telemetry device 103 may additionally be stored in a storage medium other than the prioritized queues 215, 217, and 219, such as in a flash memory 223. A log (not shown) of information may be kept for storing data such as GPS information, I/O data, and sample times. Message information that may be kept in the prioritized queues 215, 217, and 219 includes, e.g., message information associated with responses to a request made to the telemetry device 103, message information that is generated when the status of the telemetry device 103 changes, message information that is generated when alert criteria are met, and message information that is generated when a schedule indicates that data should be transmitted. Storage devices have only a finite amount of space for storage of information, and thus the information for only a finite number of messages may be stored in either the prioritized queues 215, 217, 219 or the flash memory 223.

The prioritized queues 215, 217, and 219 may be stored in the flash memory 223 when external power fails (e.g., while operating on internal power before shutting down the telemetry device 103 so that the message information is not lost). When power is restored, the information is restored to the memory 213 and the messages may then be transmitted.

In an exemplary embodiment, information collected, e.g., for up to a 72-hour period may be stored in the log in the flash memory 223. The information may be stored in the log as elements in a queue, in which the information elements are processed according to a first-in-first-out scheme.

To improve availability of the telemetry device 103, an internal battery 221 is optionally included. With the internal battery 221 the telemetry device 103 can continue to monitor and transmit alerts and status information to the NOC 101 even if the electrical system of a vehicle is inoperable. Additionally, the internal battery 221 can be used by the device 103 to gracefully report power status wirelessly and shut down gracefully when the energy level of the internal battery is becoming to low to sustain operation of the device.

The functions of the NOC 101, which interacts with the telemetry devices 103 to exchange information for supporting fleet and asset management, are detailed with respect to FIG. 3.

Figure 2B:
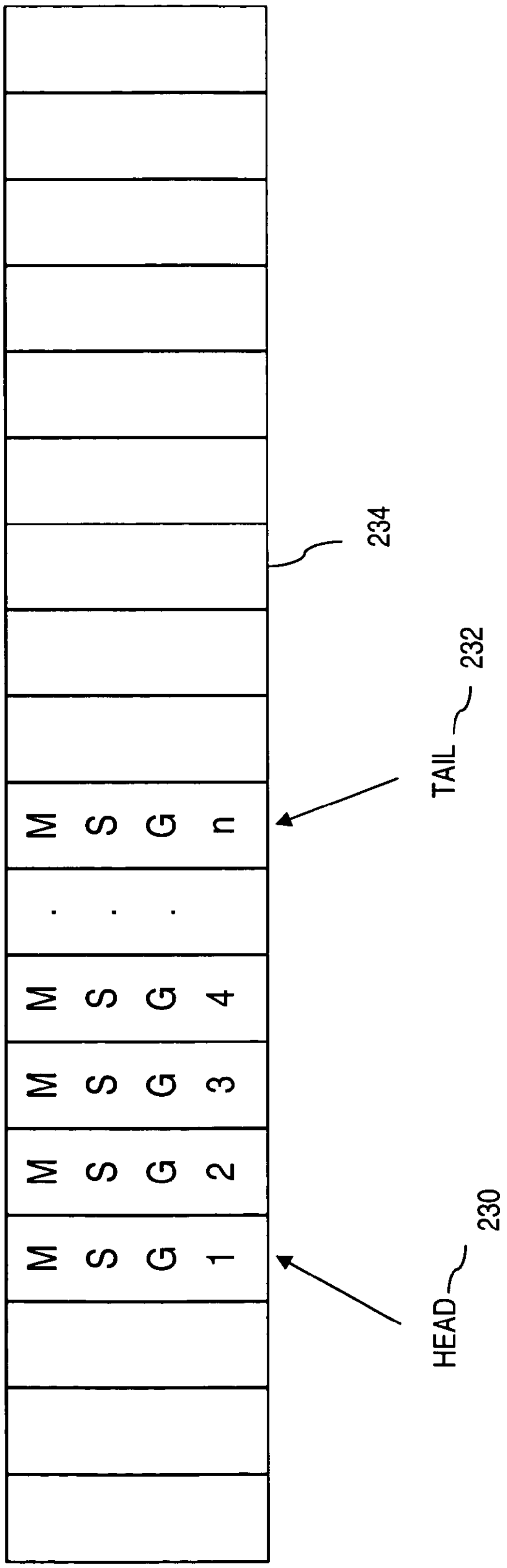
FIG. 2*b* is a diagram of an exemplary queue used in the telemetry device of FIG. 2*a*, according to an embodiment of the present invention.

FIG. 2*b* is a diagram of an exemplary queue 234 used in the telemetry device of FIG. 2*a*, according to an embodiment of the present invention. The queue 234 may include one of the prioritized queues 215, 217, 219 as shown in the memory 213, or it may, e.g., be a queue stored in the flash memory 223 (or any other storage medium) to be used for logging data.

As shown, the queue 234 includes a Head 230 indicator, which indicates a location of the current "head," or first element (next in line to be processed), and a Tail 232 indicator which indicates the current "tail," or last element (last in line to be processed) in the queue. The Head 230 and Tail 232 may, e.g., be implemented as an index into an array (if the queue 234 is implemented as an array), or, e.g., an absolute address or other reference type to the respective elements if the queue 234 is implemented, e.g., as a linked list or other suitable abstract data type.

As shown in FIG. 2*b*, the Head 230 currently references an element "msg1," and the Tail 232 currently references an element "msgn." Typical processing of a queue 234, for preparation of a stored message for transmission, involves accessing the current first element via the Head 230, and updating the Head 230 to reference the next element, which in this example, is "msg2." This type of processing continues until the queue is empty, i.e., there are no elements left to process. Addition of new elements is accomplished by determining the "next" storage location in the queue to be considered the next location after the current "tail" element. For the example shown in FIG. 2*b*, the next available storage would be the slot shown immediately to the right of "msgn." The new element is stored at the slot, and the Tail 232 reference is updated to reflect the position of the new "tail" element. For the example shown in FIG. 2*b*, when the current "tail" element is stored in the rightmost slot in the available storage, the addition procedure involves an attempt to add the next new element in the leftmost slot shown.

In the case of the prioritized queues 215, 217, 219 shown in the memory 213, if an addition attempt involves overwriting an active element (e.g., overwriting an element currently referenced by Head 230), the write is refused (i.e., the queue 215, 217, or 219 is full, and the new element is not stored in queue 215, 217, or 219), thus maintaining only the older information, and not the newer information after filling up the prioritized queue 215, 217, or 219 as shown in the memory 213.

In the case of a log (not shown) which may be stored in the flash memory 223, the new element overwrites the older element referenced by the Head 230, and the Head 230 is updated to reference the next element in the queue 234, thus maintaining only newer information in the queue 234 for the log.

Figure 2C:
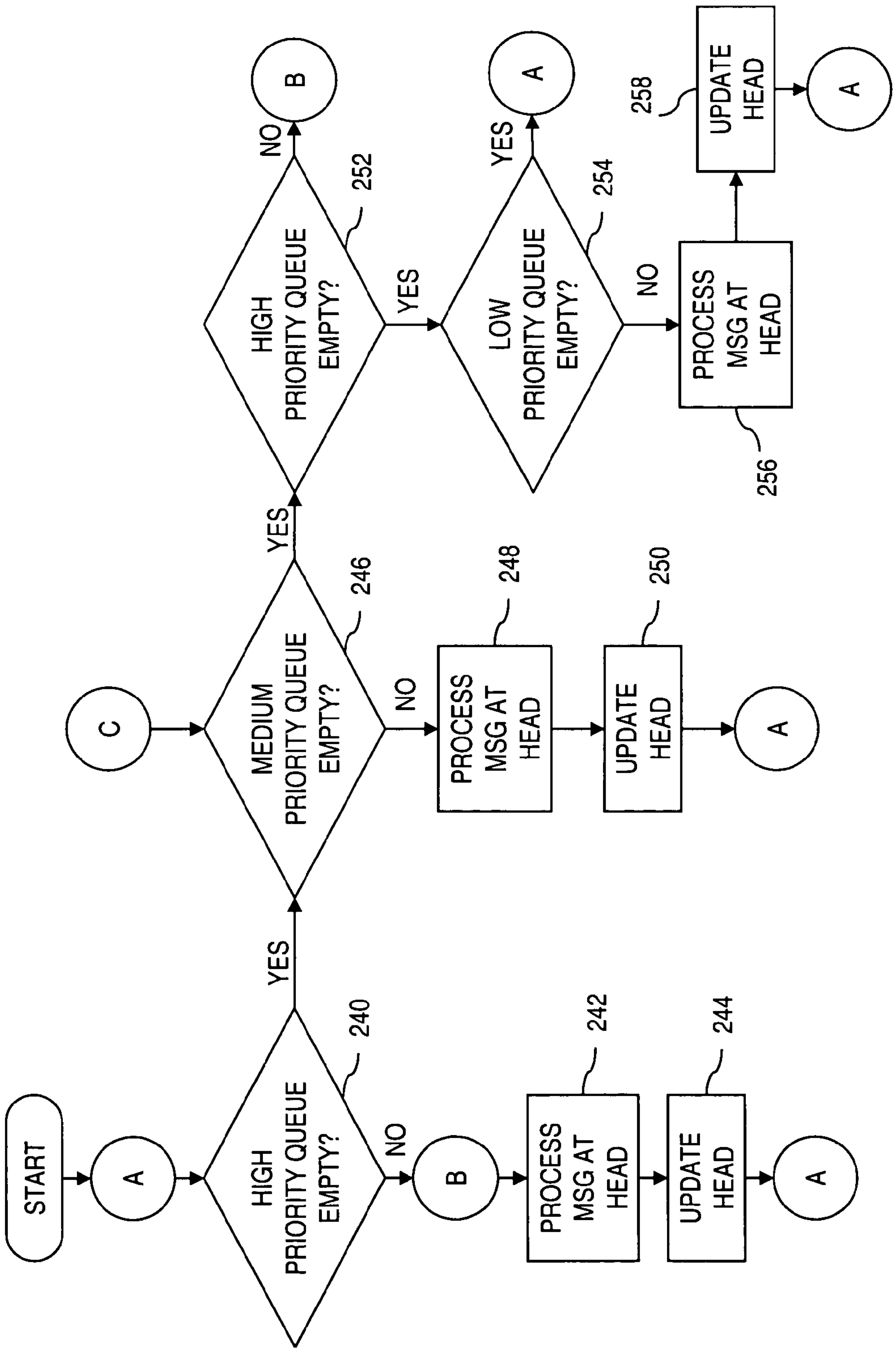
FIG. 2*c* is a flowchart detailing exemplary method steps for processing message information stored in prioritized queues used in the telemetry device of FIG. 2*a*, according to an embodiment of the present invention.

FIG. 2*c* is a flowchart detailing exemplary method steps for processing message information stored in prioritized queues 215, 217, and 219 (e.g., as shown in the memory 103) used in the telemetry device of FIG. 2*a*, according to an embodiment of the present invention. The prioritized queues are implemented based on a decision of what priorities need to be handled, and in what order, by the telemetry device 103. For non-limiting purposes of explanation, as an example, a device status change notification may be information which is considered urgent for transmission, and thus may be stored in the High Priority Queue 215. Response messages and alert messages may be considered information which is considered as having a medium priority for transmission, and may be stored in the Medium Priority Queue 217. Other messages, such as data messages not satisfying either of the previously discussed criteria, may be considered as having a low priority for transmission, and thus may be stored in the Low Priority Queue 215.

Once information has been stored in the prioritized queues 215, 217, and 219 as discussed above, the processing of messages for transmission from the device may be handled according to the exemplary method steps as shown in FIG. 2*c*. After starting, at step 240, a determination is made whether the High Priority Queue 215 is empty. This determination may be made, e.g., by simply comparing the Head 230 and the Tail 232, or it may be made by checking a flag or counter (not shown) indicating whether there are any elements currently stored in the High Priority Queue 215.

If it is determined that the High Priority Queue 215 is not empty, then step 242 processes the information stored at the "head" of the High Priority Queue 215, step 244 updates the Head 230 for the High Priority Queue 215, and control returns to step 240.

If step 240 determines that the High Priority Queue 215 is empty, step 246 determines whether the Medium Priority Queue 217 is empty. If it is determined that the Medium Priority Queue 217 is not empty, then step 248 processes the information stored at the "head" of the Medium Priority Queue 217, step 250 updates the Head 230 for the Medium Priority Queue 217, and control returns to step 240. Thus, any elements which may have arrived at the High Priority Queue 215 during the processing of an element of the Medium Priority Queue 217 will receive a higher priority in processing than elements in the other prioritized queues.

If step 246 determines that the Medium Priority Queue 217 is empty, step 252 determines whether the High Priority Queue 215 is empty. If step 252 determines that the High Priority Queue 215 is not empty, control is passed to step 242 to process a High Priority Queue 2215 element.

If step 252 determines that the High Priority Queue 215 is empty, step 254 determines whether the Low Priority Queue 219 is empty. If step 254 determines that the Low Priority Queue 219 is empty, control is passed to step 240.

If step 254 determines that the Low Priority Queue 219 is not empty, then step 256 processes the information stored at the "head" of the Low Priority Queue 219, step 258 updates the Head 230 for the Low Priority Queue 219, and control returns to step 240. Thus, any elements which may have arrived at the High Priority Queue 215 during the processing of an element of the Low Priority Queue 219 will receive a higher priority in processing than elements in the other prioritized queues.

The exemplary arrangement discussed above ensures that information considered urgent, or high priority, will be processed and transmitted before less urgent information, in a prioritized ordering of high, medium, low.

Additionally, by keeping newer log information in the log in the flash memory 223, deleting the older log information in the flash memory as storage capacity is filled, the newer log information is available, e.g., by request later if, e.g., the telemetry device 103 becomes unable to transmit information for some period of time (e.g., out of range of the provider, failure of communication facilities). By keeping the older message information in the prioritized queues 215, 217, 219 shown in the memory 213 when the storage capacity of the prioritized queues 215, 217, 219 is filled (i.e., not storing newer message information after the prioritized queues 215, 217, 219 become full), at least some older message information is still available after communication with the telemetry device 103 is restored, thus providing, at least, a capability of analyzing the information available at the time of the breakdown in communication (e.g., as an aid in determining a potential source of failure, as well as aiding in providing information which may no longer be stored in the device log), as well as a capability to provide some of the newer log information which has been accumulated in the flash memory 223 over a time period which may be determined, e.g., by the available capacity of the flash memory 223. Additionally, the above discussion included only three prioritized queues, whereas any number of prioritized queues may be used.

It is to be understood that this explanation is directed to a specific example of prioritizing information to be transmitted, and is not intended to be limiting over other equivalent means of prioritizing information to be sent by the telemetry device 103. For example, the above description relies upon ordering elements within queues 215, 217, 219 based upon their time of "arrival" for placement in the queues 215, 217, 219. This could instead be implemented by, e.g., using a buffer area for arriving information, and ordering the information in the buffer by type of information (e.g., response message information, alert message) before storing the information in the queue 215, 217, 219.

FIG. 3 shows a diagram of a Network Operations Center (NOC) in the system of FIG. 1, according to an embodiment of the present invention. The NOC 101 utilizes, in this exemplary embodiment, a client-server architecture to support the telemetry devices 103. Specifically, the NOC 101 houses a messaging server 301 for sending and receiving messages to the devices 103 over the air, for storing the messages, and routing these messages to their destination. The NOC 101 provides connectivity via a local area network (LAN) (not shown) for the messaging server 103 with an A-GPS server 303, a routing server 305, and a gateway 307. The gateway 307 communicates a with a security server 309 to support encryption and decryption of the messages. A presentation server 311 resides within the NOC 101 to interface with the data network 111 (e.g., the global Internet), such that the host 109 can access the services of the fleet and asset management system. The host 109 under this scenario is loaded with a desktop client 313.

Although a single server is shown for the presentation server 311, in the alternative, the server 311 can functionally be implemented as three separate servers: a database server, a middleware server, and a web server. The database server is responsible for data storing, data updating, and data retrieval as well as providing a set of interfaces to achieve these functions. The web server is responsible for serving maps, presenting user interfaces to manage and control user administration, device configuration, and etc. The middleware server can be deployed between the database server and the web server, and has the following responsibilities: 1) converting the web server's data retrieval requests to database server APIs and then sending to database server, 2) receiving the responses from the database server and then sending back to web server, 3) receiving data from gateway 307 and then sending requests to the database to store/update data records. Because of the modularity in this design, these three components can reside on the same machine, as shown in FIG. 3, or reside in multiple platforms.

Messages from the telemetry devices 103 are forwarded by the messaging server 301 to either the A-GPS server 303 or the routing server 305. If the message is an assist request, this message is sent to the A-GPS server 303. In response to the GPS assist request, the A-GPS server 303 determines GPS assistance data for transmission to the requesting telemetry device 103.

The A-GPS server 303 obtains ephemeris data from the GPS reference network 113, and determines satellite configuration for each of the geographic zones comprising the wireless network. The A-GPS server 303 also determines the assistance data for each geographic zone. The NOC 101 then periodically broadcasts the assistance data to each geographic zone. In addition, the A-GPS server 303 supplies GPS assistance data to any telemetry device 103 that requests the GPS assistance data. When supporting this request, the NOC 101 determines approximate location of the requesting device 103 (based upon base receivers that received the request, using a type of triangulation. Subsequently, a GPS Assistance message is generated by the A-GPS server 303 to send to the telemetry device 303 based upon its approximate location. The messaging server 301 sends the GPS Assistance message to the particular telemetry device 103.

Thus, the A-GPS server 303 delivers GPS assistance data through two mechanisms by periodically broadcasting GPS assistance data to all devices 103 in each of the geographic zones covered by the wireless network 107, or by responding to specific requests by the telemetry devices 103 for GPS assistance data.

The routing server 305 has responsibility for routing of the messages from the telemetry devices 103, and managing such messages from the devices 103 to their server destinations. Each device 103 can be configured to have messages directed to one or more destination servers. The routing server 305, upon receiving message from a telemetry device 103, determines a destination address that has been configured for the device 103 and modifies the destination address accordingly. The message is then forwarded to the configured destination. By default, the messages are directed to the gateway 307.

The gateway 307 interfaces with the presentation server 311 to permit the desktop client 313 access to the fleet and asset management system. The gateway 307 provides translation of messages and commands from the presentation server 311 to the wireless protocol for communication with the telemetry devices 103. For example, the gateway 307 supports an eXtensible Markup Language (XML) interface, such that XML commands submitted to the gateway 307 over wireline are converted to the wireless protocol commands and sent over the paging network 107 to the devices 103. In turn, the wireless protocol messages received from the devices 103 are converted to wireline XML messages. The gateway 307 provides translation of wireline messages and commands from the host 109 to the wireless protocol for communication with the telemetry devices 103. In turn, the wireless protocol messages received from the devices 103 are converted to wireline XML messages and sent to host 109.

The presentation server 311 provides the following functions: fleet and asset tracking, and general purpose I/O monitoring and control. The server 311 also maintains a database (not shown) for user accounts and other related data (e.g., configuration data, user management information, device management, and data acquired from the devices 103). The presentation server 311, as mentioned, also generates the maps corresponding to where the devices 103 are tracked and the mapping preferences configured. Using the desktop client 313, a user can even issue requests to command a particular device 103, such as requesting location of the device 103.

With the presentation server 311 as a front end, a user via the desktop client 313 can configure the telemetry devices 103 via web interfaces. In an exemplary embodiment, the server 311 is a World Wide Web ("web") application server to support a web browser based front-end for the desktop clients 109. The web application server (not shown) can be deployed to support such web interfaces as a set of Java Server Pages (JSP) and Java Applet to interact with the user on the desktop client 313. On the backend, based on data collected by JSP and Java Applet, the web server can generate the proper XML commands that are compliant with Application Programming Interface (API) of the presentation server 311. Consequently, the collected records can be stored in the database of the presentation server 311. The database also stores the properties of the telemetry devices 103, such as the alerts and thresholds earlier described.

The desktop client 313 interfaces to the system 100 through the presentation server 311. From the desktop client 313, the user logs in to the system 100. The presentation server 311 can also perform authentication as well as administration tasks such as adding new users or devices 103. The user can also configure business rules executed by the presentation server 311, wherein the business rules logic uses this user supplied configuration to configure the devices 103, acquire, and process data from the devices 103.

Additionally, the presentation server 311 provides a reporting capability based on the stored information in the database. The presentation server 311 can support standard reports or customize reports to the user via the desktop client 313.

Figure 7:
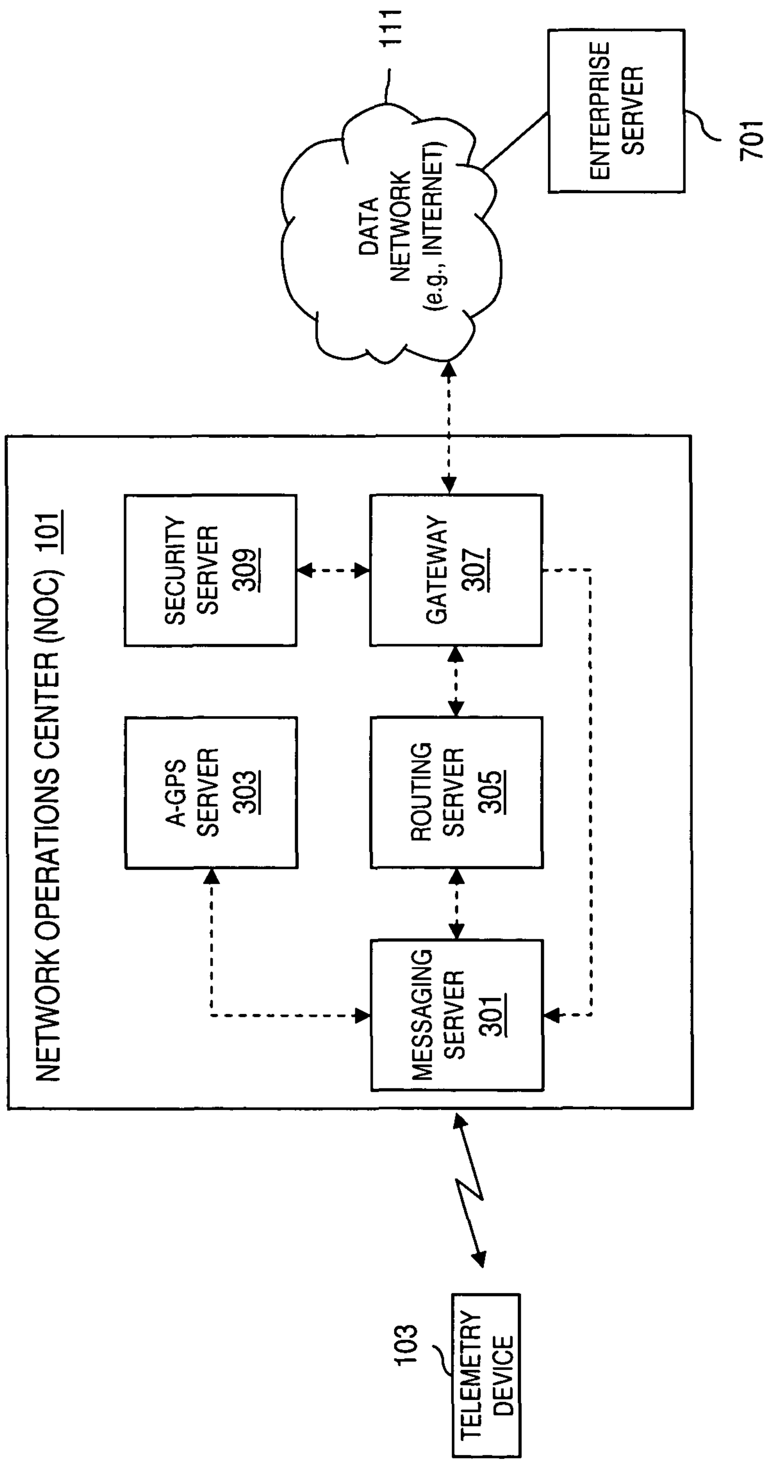
FIG. 7 is a diagram of a Network Operations Center (NOC) in the system of FIG. 1, according to an embodiment of the present invention.

Instead of using a desktop client 313, the user, if associated with a large organization, can utilize an enterprise server to obtain all of the user functionality through the gateway 307 using the API of the fleet and asset management system 100. Accordingly, the enterprise server would possess the functional capabilities of the presentation server 311, but would be managed by the customer (or user) at the customer's premise, as shown in FIG. 7.

As noted, the wireless protocol supports communications between the NOC 101 and the telemetry devices 103. In an exemplary embodiment, the messaging is performed according the FLEXsuite Uniform Addressing & Routing (UAR) protocol (developed by Motorola). The wireless protocol message, which can be encapsulated with an UAR message, is unencrypted.

Figure 4:
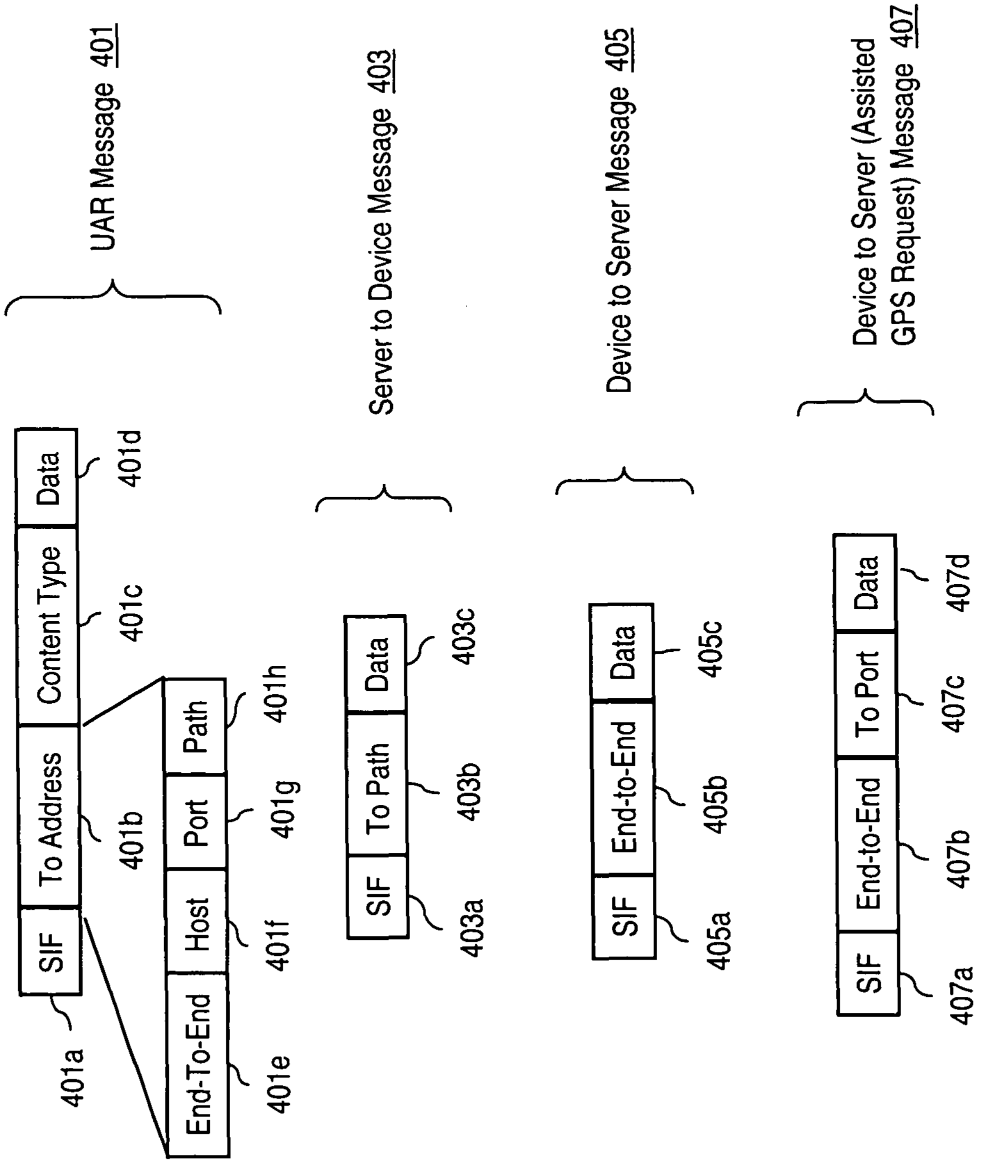
FIG. 4 is a diagram of the formats of protocol messages used in the system of FIG. 1.

FIG. 4 shows a diagram of the formats of protocol messages used in the system of FIG. 1. By way of example, the protocol is the UAR protocol. Accordingly, a UAR message 401 includes the following fields: a Status Information Field (SIF) field 401*a*, a Destination Address ("To Address") field 401*b*, a Content Type field 401*c*, and a Data field 401*d*. Table 1, below, defines these fields 401*a*-401*c*.

TABLE 1

| Field | Definition | Data Type | Size |
|---|---|---|---|
| SIF | Identifies the application protocol used to encode the remaining data in the message; indicates UAR addressing is used | Integer | 8 bits |

TABLE 1-continued

| Field | Definition | Data Type | Size |
|---|---|---|---|
| To Address | Destination Address | UAR "To Address" Encoding | Variable |
| Content Type | Identifies the format of the attached Data | UAR Content Type | 24 bits |
| Data | UAR format data payload | UAR data | Variable |

With respect to the "To Address" field 401*b*, this address can be further specified the following fields: an End-To-End field 401*e*, a Host field 401*f*, a Port field 401*g*, and a Path field 401*h*. The End-To-End field 401*e* is utilized for device to server routing. It is noted that no addressing is needed for device to server routing with the exception of an Assisted GPS Request message. Because the routing server 305 controls message routing from the telemetry device 103, some of the address information requirement is specific to UAR. Path Addressing, per the Path field 401*h*, is used for server to device routing, as in the case, for example, addressing of a peripheral device attached to the telemetry device 103. As shown in FIG. 4, for server to device messaging, message 403 can be used and includes a SIF field 403*a*, a To Address field 403*b* specifying the path, and a Data field 403*c*. A device to server message 405 utilizes a SIF field 405*a*, a To Address field 405*b* specifying the End-to-End address, and a Data field 405*c*. In the case of a device to server transmission relating to acquisition of Assisted GPS (e.g., in form of an Assisted GPS request), a message 407 is provided, and includes a SIF field 407*a*, a To Address field specifying the End-to-End address 407*b* and Port 407*c*, and a Data field 405*c*.

Figure 5:
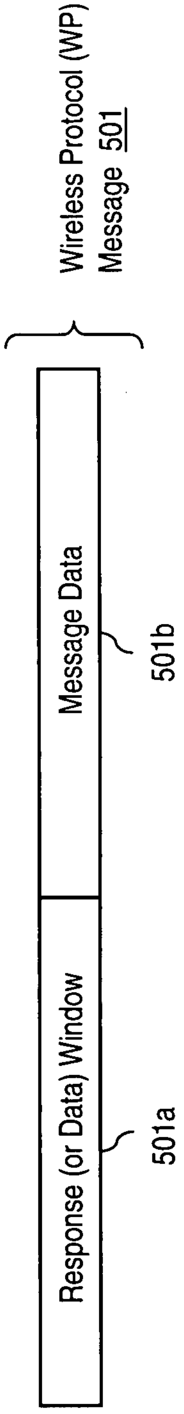
FIG. 5 is a diagram of the formats of a Wireless Protocol (WP) message used in the system of FIG. 1.
Figure 6:
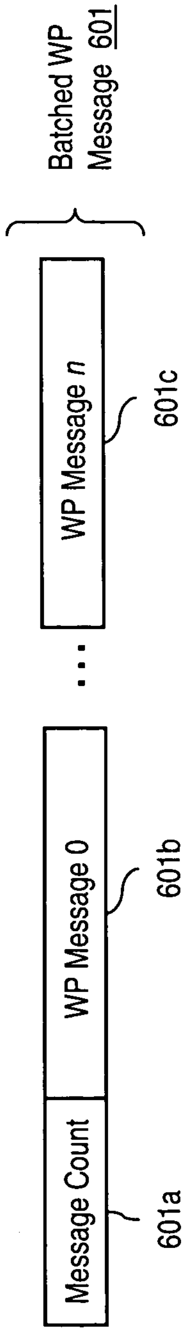
FIG. 6 is a diagram of the format of a batched Wireless Protocol (WP) message used in the system of FIG. 1.

As regards UAR messages in general, the Data field 401*d* contains binary formatted data, which is the unencrypted Wireless Protocol (WP) message (as described in FIGS. 5 and 6).

FIG. 5 shows a diagram of the format of a Wireless Protocol (WP) message used in the system of FIG. 1. A Wireless Protocol message 501 includes a Response Window (or Data Window) field 501*a* to regulate the over-to-air transmission of the message from the telemetry device 103 to the NOC 101, as described previously. In other words, with the telemetry devices 103, accommodation is made to support staggering of device responses to prevent overwhelming the reverse path of the wireless network 107 (FIG. 1) if a command is sent to a large number of devices in a broadcast message. The Response Window field 501*a* is thus used to specify a desired time frame for obtaining responses from deployed devices 103. If a Response Window is specified in a message, the device 103 delays sending its response using an Offset value within the Response Window when responding to the message. That is, after first processing the message, the device 103 delays sending the response to the message until the Offset time has expired. To ensure a good distribution of responses during the Response Window, the device 103, in an exemplary embodiment, can randomly select an Offset time within the specified time window.

The message 501 also provides a Message Data field 501*b* for specifying the data (such as data within the data log, and alerts).

According to one embodiment of the present invention, the NOC 101 can batch the WP messages 501 to reduce overhead, resulting in a batched message 601. The batched message 601 specifies a Message Count field 601*a* to indicate the number of WP messages 501 (0 . . . n, where n is an integer) that are contained within the batched message 601. The WP Message fields 601*b*, 601*c* pertain to the corresponding messages specified by the Message Count value in the field 601*a*.

The messages of FIGS. 5 and 6 support a number of transactions between the NOC 101 and the telemetry device 103. For example, server transactions involve a request being sent from a server (e.g., servers 301, 303, and 305) to the device 103 and a response sent from the device 103 to the server.

FIG. 7 shows a diagram of a Network Operations Center (NOC) in the system of FIG. 1, according to an embodiment of the present invention. An enterprise approach eliminates the need for the presentation server 311 in the NOC 101. An enterprise server 701 communicates directly with the gateway 307 over the data network 111. This architecture advantageously provides the customer with greater flexibility in developing applications for the fleet and asset management system 100.

The discussion thus far of the fleet and asset management system 100 has provided security from the telemetry devices 103 to the NOC 101 through use of the security server 309 resident within the NOC 101. In the alternative, end-to-end encryption can be supported by situating the security server at the customer premise, as described in FIG. 8 and FIG. 9.

Figure 8:
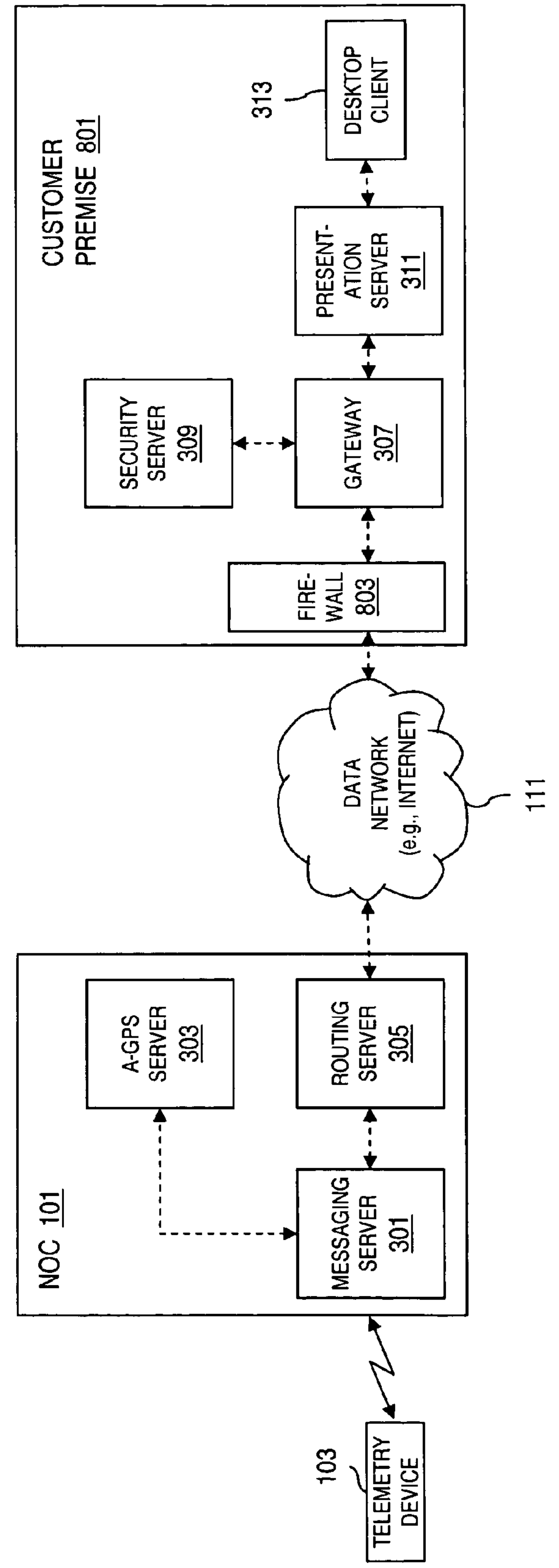
FIG. 8 is a diagram of a fleet and asset management system with end-to-end encryption, according to an embodiment of the present invention.

FIG. 8 shows a diagram of a fleet and asset management system with end-to-end encryption, according to an embodiment of the present invention. Under this architecture, a customer premise 801 houses the security server 309, the gateway 307, and the presentation server 311. The presentation server 311 operates with the desktop client 313 as detailed with respect to FIG. 3. In this example, a firewall 803 is implemented between the data network 111 and the gateway 307; this added security feature eliminates any potential gaps in security at the NOC that occurs when decrypting the wireline message and re-encrypting the wireless message.

Figure 9:
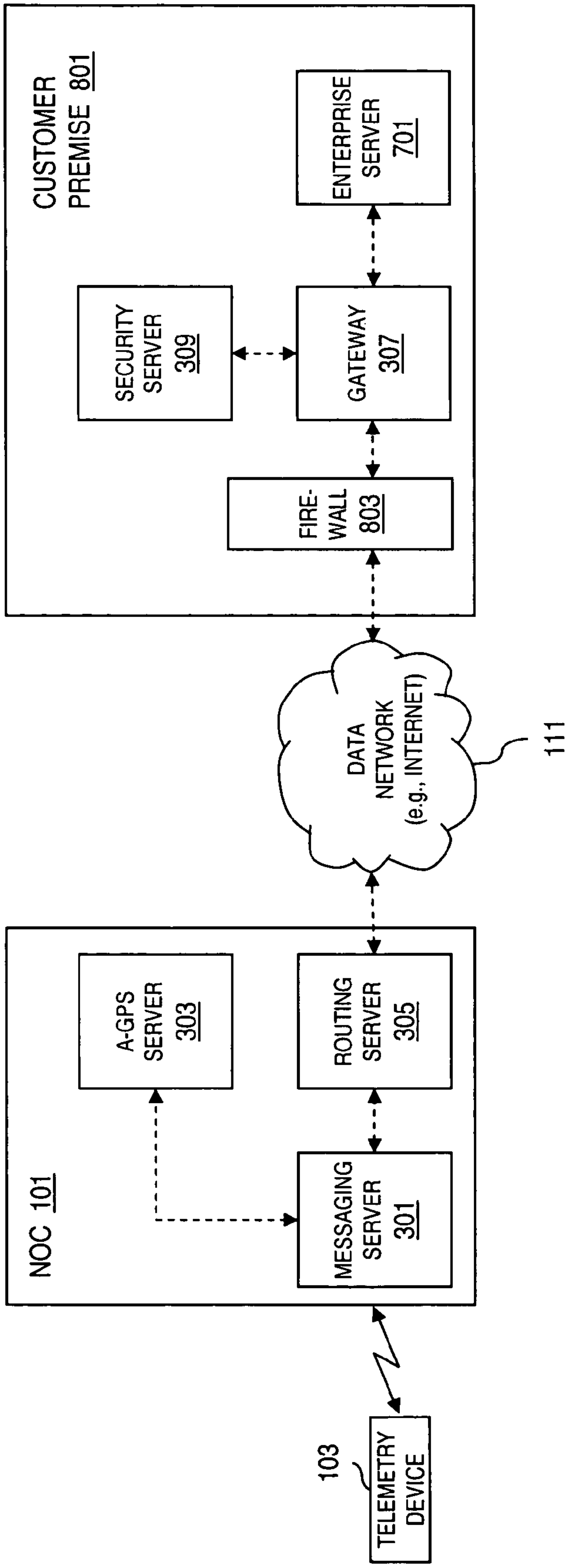
FIG. 9 is a diagram of a fleet and asset management system with end-to-end encryption in an enterprise environment, according to an embodiment of the present invention.

FIG. 9 shows a diagram of a fleet and asset management system with end-to-end encryption in an enterprise environment, according to an embodiment of the present invention. In this scenario, the customer premise 801 does not house the presentation server 311 that communicates with the desktop client 313, but instead includes the enterprise server 701.

Figure 10:
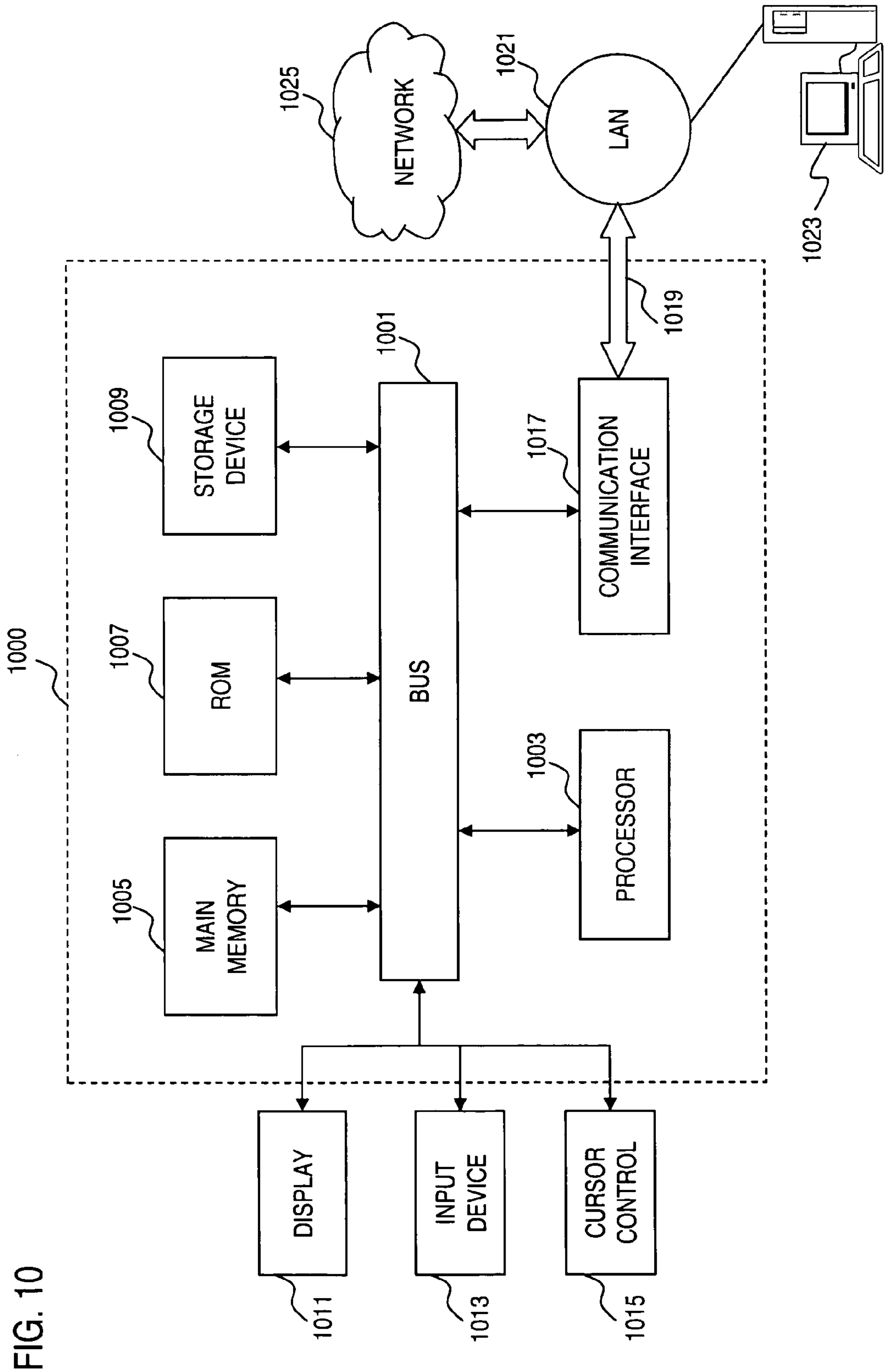
FIG. 10 is a diagram of a computer system that can be used to implement an embodiment of the present invention.

FIG. 10 illustrates a computer system 1000 upon which an embodiment according to the present invention can be implemented. For example, the client and server processes for supporting fleet and asset management can be implemented using the computer system 1000. The computer system 1000 includes a bus 1001 or other communication mechanism for communicating information and a processor 1003 coupled to the bus 1001 for processing information. The computer system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011.

According to one embodiment of the invention, the processes of the servers and clients in the system 100 of FIG. 1 are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement the embodiment of the present invention. Thus, embodiments of the present invention are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 (e.g. a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an embodiment of the present invention through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1005 for execution. Such a medium may take many forms, including but not limited to non-volatile media, volatile media, and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

The following patent applications are incorporated by reference in their entireties: co-pending U.S. patent application Ser. No. 10/759,406, filed Jan. 16, 2004, entitled "Method and System for Scheduling of Data Retrieval from Mobile Telemetry Devices"; co-pending U.S. patent application Ser. No. 10/758,770, filed Jan. 16, 2004, entitled "Method and System for Tracking Mobile Telemetry Devices"; co-pending U.S. patent application Ser. No. 10/758,769, filed Jan. 16, 2004, now abandoned, entitled "Method and System for Remotely Configuring Mobile Telemetry Devices"; co-pending U.S. patent application Ser. No. 10/758,930, filed Jan. 16, 2004, entitled "Method and System for Interfacing with Mobile Telemetry Devices"; co-pending U.S. patent application Ser. No. 10/759,404, filed Jan. 16, 2004, entitled "Method and System for Transmitting Assistance Location Data for Fleet and Asset Management"; co-pending U.S. patent application Ser. No. 10/758,213 filed Jan. 16, 2004, entitled "Method and System for Tracked Device Location and Route Adherence via Geofencing"; and co-pending U.S. patent application Ser.

No. 10/758,199 filed Jan. 16, 2004, entitled "Method and System for Secured Wireless Data Transmission to and from a Remote Device."

While the present invention has been described in connection with a number of embodiments and implementations, the present invention is not so limited but covers various obvious modifications and equivalent arrangements, which fall within the purview of the appended claims.

What is claimed is:

1. A method for prioritizing transmission of messages from a telemetry device, the method comprising:

storing a first information element in a device log in the telemetry device;

determining whether the first information element includes a first priority level indication;

storing the first information element in a first data structure in the telemetry device when it is determined that the first information element includes the first priority level indication;

storing a second information element in the device log;

determining whether the second information element includes a second priority level indication;

storing the second information element in a second data structure in the telemetry device when it is determined that the second information element includes the second priority level indication;

transmitting a first message based on the first information element from the telemetry device for receipt by an operation unit; and after transmitting the first message, transmitting a second message based on the second information element from the telemetry device for receipt by the operation unit, wherein an ordering of transmission is based on the first and second level priority indications, wherein the first information element and the second information elements are elements in separate queues within the telemetry device, and when the queues are full, no new information is permitted to be added to the full queues; and wherein the first information element is a device status change notification stored in a high priority queue, and the second information element is a response message stored in a medium priority queue.

2. A method according to claim 1, wherein the first data structure includes a first queue, the second data structure includes a second queue, and the device log includes a third queue.

3. A method according to claim 1, wherein the first data structure is associated with the first priority level indication and the second data structure is associated with a second priority level indication.

4. A method according to claim 1, further comprising:

determining whether a third information element absent from the device log includes a third priority level indication;

storing the third information element in a third data structure when it is determined that the third information element includes the third priority level indication; and after transmitting the second message, transmitting a third message based on the third information element, wherein the ordering of transmission is further based on the first, second, and third level priority indications.

5. A method according to claim 1, further comprising:

storing a fourth information element in the device log;

determining whether the fourth information element includes the first priority level indication;

determining whether the first data structure includes storage available for storing the fourth information element when it is determined that the fourth information element includes the first priority level indication; and discarding the fourth information element from consideration of storage in the first data structure when the step of determining whether the first data structure includes storage available determines that storage for storing the fourth information element is unavailable in the first data structure.

6. A method according to claim 1, wherein the first data structure and the second data structure are stored in a dynamic memory included in the telemetry device, and the device log is stored in a flash memory included in the telemetry device.

7. A method according to claim 1, further comprising:

receiving a request for data of the telemetry device; and transmitting a data message based on content of the device log in response to the request.

8. A telemetry device for prioritizing transmission of messages from the telemetry device, the telemetry device comprising:

a device log including a first information element and a second information element;

a first data structure, other than the device log, including the first information element which includes a first priority level indication;

a second data structure, other than the device log, including the second information element which includes a second priority level indication;

wherein the first information element and the second information elements are elements in separate queues within the telemetry device and when the queues are full, no new information is permitted to be added to the full queues; and a processor configured to determine whether the first information element includes a first priority level indication, to determine whether the second information element includes a second priority level indication, to transmit a first message based on the first information element from the telemetry device for receipt by an operation unit, and after transmitting the first message, to transmit a second message based on the second information element from the telemetry device for receipt by the operation unit, wherein an ordering of transmission is based on the first and second level priority indications, wherein the first information element is a device status change notification stored in a high priority queue, and the second information element is a response message stored in a medium priority queue.

9. A telemetry device according to claim 8, wherein the first data structure includes a first queue, the second data structure includes a second queue, and the device log includes a third queue.

10. A telemetry device according to claim 8, wherein the first data structure is associated with the first priority level indication and the second data structure is associated with a second priority level indication.

11. A telemetry device according to claim 8, wherein the processor is further configured to determine whether a third information element absent from the device log includes a third priority level indication, to store the third information element in a third data structure when it is determined that the third information element includes the third priority level indication; and after transmitting the second message, to transmit a third message based on the third information element, wherein the ordering of transmission is further based on the first, second, and third level priority indications.

12. A telemetry device according to claim 8, wherein the device log includes a fourth information element, and the processor is further configured to determine whether the fourth information element includes the first priority level indication to determine whether the first data structure includes storage available for storing the fourth information element when it is determined that the fourth information element includes the first priority level indication, and to discard the fourth information element from consideration of storage in the first data structure when the determination of whether the first data structure includes storage available determines that storage for storing the fourth information element is unavailable in the first data structure.

13. A telemetry device according to claim 8, further comprising:

a dynamic memory including the first data structure and the second data structure; and a flash memory including the device log.

14. A telemetry device according to claim 8, wherein the processor is further configured to receive a request for data of the telemetry device, and to transmit a data message based on content of the device log.

15. A non-transitory computer-readable storage medium carrying one or more sequences of one or more instructions for prioritizing transmission of messages from a telemetry device, the one or more sequences of one or more instructions including instructions which, when executed by one or more processors, cause the one or more processors to perform the steps of:

storing a first information element in a device log in the telemetry device;

determining whether the first information element includes a first priority level indication; storing the first information element in a first data structure in the telemetry device when it is determined that the first information element includes the first priority level indication;

storing a second information element in the device log;

determining whether the second information element includes a second priority level indication;

storing the second information element in a second data structure in the telemetry device when it is determined that the second information element includes the second priority level indication;

transmitting a first message based on the first information element from the telemetry device for receipt by an operation unit; and after transmitting the first message, transmitting a second message based on the second information element from the telemetry device for receipt by the operation unit, wherein an ordering of transmission is based on the first and second level priority indications wherein the first information element and the second information elements are elements in separate queues within the telemetry device, and when the queues are full, no new information is permitted to be added to the full queues, wherein the first information element is a device status change notification stored in a high priority queue, and the second information element is a response message stored in a medium priority queue.

16. A non-transitory computer-readable storage medium according to claim 15, wherein the first data structure includes a first queue, the second data structure includes a second queue, and the device log includes a third queue.

17. A non-transitory computer-readable storage medium according to claim 15, wherein the first data structure is associated with the first priority level indication and the second data structure is associated with a second priority level indication.

18. A non-transitory computer-readable storage medium according to claim 15, further including instructions for causing the one or more processors to perform the steps of:

determining whether a third information element absent from the device log includes a third priority level indication;

storing the third information element in a third data structure when it is determined that the third information element includes the third priority level indication;

and after transmitting the second message, transmitting a third message based on the third information element, wherein the ordering of transmission is further based on the first, second, and third level priority indications.

19. A non-transitory computer-readable storage medium according to claim 15, further including instructions for causing the one or more processors to perform the steps of:

storing a fourth information element in the device log;

determining whether the fourth information element includes the first priority level indication;

determining whether the first data structure includes storage available for storing the fourth information element when it is determined that the fourth information element includes the first priority level indication; and discarding the fourth information element from consideration of storage in the first data structure when the step of determining whether the first data structure includes storage available determines that storage for storing the fourth information element is unavailable in the first data structure.

20. A non-transitory computer-readable storage medium according to claim 15, wherein the first data structure and the second data structure are stored in a dynamic memory included in the telemetry device, and the device log is stored in a flash memory included in the telemetry device.

21. A non-transitory computer-readable storage medium according to claim 15, further including instructions for causing the one or more processors to perform the steps of:

receiving a request for data of the telemetry device; and transmitting a data message based on content of the device log in response to the request.

22. A method for prioritizing transmission of messages from a telemetry device, the method comprising:

storing a plurality of information elements in a device log in the telemetry device;

selectively storing each of a group of the plurality of information elements in one of a plurality of data structures in the telemetry device based on a priority indicator associated with each one of the information elements of the group;

selecting one of the plurality of data structures based on one of the priority indicators; and transmitting a message including one of the information elements of the selected one of the data structures from the telemetry device for receipt by an operation unit, wherein each of the information elements is an element in a respective prioritized queue of a plurality of queues within the telemetry device, and when the queues are full, no new information is permitted to be added to the full queues;

wherein a first one of the plurality of information elements is a device status change notification stored in a high priority queue, and a second one of the plurality of information elements is a response message stored in a medium priority queue.

23. A method according to claim 22, further comprising:

storing the plurality of data structures in a memory including the device log, when an external power source of the telemetry device fails.

24. An apparatus for prioritizing transmission of messages from a telemetry device, the apparatus comprising:

means for storing a plurality of information elements in a device log in the telemetry device;

means for selectively storing a group of each of the plurality of information elements in one of a plurality of data structures in the telemetry device based on a priority indicator associated with each one of the information elements;

means for selecting one of the plurality of data structures based on one of the priority indicators; and means for transmitting a message including one of the information elements of the selected one of the data structures from the telemetry device to an operation unit, wherein each of the information elements is an element in a respective prioritized queue of a plurality of queues within the telemetry device, and when the queues are full, no new information is permitted to be added to the full queues, wherein a first one of the plurality of information elements is a device status change notification stored in a high priority queue, and a second one of the plurality of information elements is a response message stored in a medium priority queue.

25. An apparatus according to claim 24, further comprising:

means for storing the plurality of data structures in a memory including the device log, when an external power source of the telemetry device fails.

* * * * *